United States Patent
Abramov et al.

(10) Patent No.: US 9,790,121 B2
(45) Date of Patent: Oct. 17, 2017

(54) METHODS OF FABRICATING A GLASS RIBBON

(75) Inventors: Anatoli Anatolyevich Abramov, Painted Post, NY (US); James William Brown, Painted Post, NY (US); Chester Hann Huei Chang, Painted Post, NY (US); Sean Matthew Garner, Elmira, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 960 days.

(21) Appl. No.: 13/182,029

(22) Filed: Jul. 13, 2011

(65) Prior Publication Data

US 2012/0247154 A1 Oct. 4, 2012

Related U.S. Application Data

(60) Provisional application No. 61/469,321, filed on Mar. 30, 2011.

(51) Int. Cl.
 *C03B 33/023* (2006.01)
 *C03B 33/09* (2006.01)
 *C03B 35/24* (2006.01)

(52) U.S. Cl.
 CPC ........ *C03B 33/0235* (2013.01); *C03B 33/091* (2013.01); *C03B 35/243* (2013.01); *C03B 35/246* (2013.01); *Y02P 40/57* (2015.11)

(58) Field of Classification Search
 CPC ................................................. C03B 33/0235
 USPC .................................................... 65/25.2, 97
 See application file for complete search history.

(56) References Cited

U.S. PATENT DOCUMENTS

| | | | |
|---|---|---|---|
| 2,505,103 A | 4/1950 | Devol | |
| 3,740,205 A * | 6/1973 | Cayphas | 65/25.4 |
| 4,828,900 A * | 5/1989 | Mouly | 428/192 |
| 6,502,423 B1 | 1/2003 | Ostendarp et al. | 65/29.14 |
| 2007/0169849 A1 | 7/2007 | Yahagi et al. | |
| 2010/0192634 A1* | 8/2010 | Higuchi et al. | 65/60.1 |
| 2010/0242546 A1* | 9/2010 | Tsuji et al. | 65/370.1 |
| 2011/0094267 A1* | 4/2011 | Aniolek et al. | 65/91 |
| 2011/0177290 A1 | 7/2011 | Tomamoto et al. | |

(Continued)

FOREIGN PATENT DOCUMENTS

| | | |
|---|---|---|
| CN | 101121220 A | 2/2008 |
| EP | 2236281 A1 * | 6/2010 |
| WO | WO02/14229 | 2/2002 |

(Continued)

*Primary Examiner* — John Hoffmann
(74) *Attorney, Agent, or Firm* — Thomas R. Beall; Jeffrey A. Schmidt (57) ABSTRACT

Methods of fabricating a glass ribbon comprise the step of bending a glass ribbon in a cutting zone to provide a bent target segment with a bent orientation in the cutting zone. The methods further include the step of severing at least one of the edge portions from the central portion of the bent target segment within the cutting zone. Further methods are provided including the step of bending a glass ribbon in a bending zone downstream from a downward zone, wherein the glass ribbon includes an upwardly concave surface through the bending zone. The methods further include the step of severing at least one of the edge portions from the central portion of a target segment within the bending zone.

19 Claims, 6 Drawing Sheets

(56) References Cited

U.S. PATENT DOCUMENTS

2011/0197634 A1    8/2011  Eta
2011/0223386 A1*   9/2011  Tomamoto et al. .......... 428/156

FOREIGN PATENT DOCUMENTS

| WO |    2006121709 A1 | 11/2006 |
|----|------------------|---------|
| WO | WO 2009/093505   |  7/2009 |
| WO | WO 2010/038758   |  4/2010 |
| WO | WO 2010/038759   |  4/2010 |
| WO |   WO2010038757   |  4/2010 |
| WO |   WO2010038760   |  4/2010 |
| WO |   WO2010038761   |  4/2010 |

* cited by examiner

METHODS OF FABRICATING A GLASS RIBBON

This application claims the benefit of priority under 35 U.S.C. §119 of U.S. Provisional Application Ser. No. 61/469,321 filed on Mar. 30, 2011, the content of which is relied upon and incorporated herein by reference in its entirety.

TECHNICAL FIELD

The present invention relates generally to a methods of fabricating a glass ribbon, and more particularly to methods of fabricating a glass ribbon including the step of severing at least one edge portion from a central portion of the glass ribbon.

BACKGROUND

Glass manufacturing apparatus are commonly used to form various glass products such as LCD sheet glass. It is known to manufacture sheet glass by downwardly flowing molten glass over a forming wedge and using edge rollers to engage beads formed at opposite edge portions of a glass ribbon.

SUMMARY

The following presents a simplified summary of the disclosure in order to provide a basic understanding of some example aspects described in the detailed description.

In one example aspect, a method of fabricating a glass ribbon comprises the step of (I) providing a source of the glass ribbon with a pair of opposed edge portions and a central portion laterally spanning between the opposed edge portions. The method can further include the steps of: (II) traversing the glass ribbon in a downward direction relative to the source through a downward zone; and (III) bending the glass ribbon in a bending zone downstream from the downward zone, wherein the glass ribbon includes an upwardly concave surface through the bending zone. The method further includes the steps of (IV) traversing the glass ribbon into a cutting zone downstream from the bending zone; and (V) bending the glass ribbon in the cutting zone to provide a bent target segment with a bent orientation in the cutting zone. The method also includes the step of: (VI) severing at least one of the edge portions from the central portion of the bent target segment within the cutting zone.

In accordance with one embodiment of the aspect, the method further includes the step of supporting the bent target segment with a curved air bar while severing at least one of the edge portions from the central portion of the bent target segment within the cutting zone.

In accordance with another embodiment of the aspect, during step (V) the glass ribbon is bent such that the bent orientation of the target segment includes an upwardly facing convex surface.

In accordance with still another embodiment of the aspect, the step of severing at least one of the edge portions includes a step of heating a portion of the upwardly facing convex surface of the bent target segment with an optical delivery apparatus.

In accordance with yet another example embodiment of the aspect, the step of severing at least one of the edge portions further includes cooling the heated portion of the upwardly facing convex surface with a coolant fluid.

In accordance with still another example embodiment of the aspect, the step of heating the portion of the upwardly facing convex surface includes shaping a laser beam of the optical delivery apparatus to contact the portion of the convex surface with an elongated radiation zone of the laser beam.

In accordance with another example embodiment of the aspect, the method includes the step of supporting the bent target segment with an upwardly facing convex support surface of an air bar while severing at least one of the edge portions from the central portion of the bent target segment within the cutting zone.

In accordance with another embodiment of the aspect, during step (V), the glass ribbon is bent such that the bent orientation of the target segment includes an upwardly facing concave surface.

In accordance with still another embodiment of the aspect, the step of severing at least one of the edge portions includes a step of heating a portion of the upwardly facing concave surface of the target segment with an optical delivery apparatus.

In accordance with yet another embodiment of the aspect, the step of severing at least one of the edge portions further includes cooling the heated portion of the upwardly facing concave surface with a coolant fluid.

In still another example embodiment of the aspect, the step of heating the portion of the upwardly facing concave surface includes shaping a laser beam from the optical delivery apparatus to contact the portion of the concave surface with an elongated radiation zone of the laser beam.

In accordance with still another embodiment of the aspect, the method can include the step of supporting the bent target segment with an upwardly facing concave support surface of an air bar while severing at least one of the edge portions from the central portion of the bent target segment within the cutting zone.

In accordance with yet another embodiment of the aspect, the source comprises a coiled spool of glass ribbon and the method further includes the step of uncoiling the glass ribbon from the coiled spool of glass ribbon to traverse the glass ribbon in the downward direction during step (II).

In accordance with still another embodiment of the aspect, the source comprises a down draw glass forming apparatus and the method further includes the step of fusion down drawing the glass ribbon from the down draw glass forming apparatus to traverse the glass ribbon in the downward direction during step (II).

In accordance with still another embodiment of the aspect, the method further includes the step of coiling the central portion of the glass ribbon into a storage roll after step (VI).

In accordance with another example aspect, a method of fabricating a glass ribbon comprises the step of: (I) providing a source of the glass ribbon with a pair of opposed edge portions and a central portion laterally spanning between the opposed edge portions. The method further includes the step of: (II) traversing the glass ribbon in a downward direction relative to the source through a downward zone. The method further includes the steps of: (III) bending the glass ribbon in a bending zone downstream from the downward zone, wherein the glass ribbon includes an upwardly concave surface through the bending zone; and (IV) severing at least one of the edge portions from the central portion of a target segment within the bending zone.

In accordance with one embodiment of the aspect, the source comprises a coiled spool of glass ribbon and the method further includes the step of uncoiling the glass ribbon from the coiled spool of glass ribbon to traverse the glass ribbon in the downward direction during step (II).

In accordance with another embodiment of the aspect, the source comprises a down draw glass forming apparatus and the method further includes the step of fusion down drawing the glass ribbon from the down draw glass forming apparatus to traverse the glass ribbon in the downward direction during step (II).

In accordance with one embodiment of the aspect, the method further includes the step of coiling the central portion of the glass ribbon into a coiled spool of glass ribbon after step (IV).

BRIEF DESCRIPTION OF THE DRAWINGS

These and other aspects are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 1:
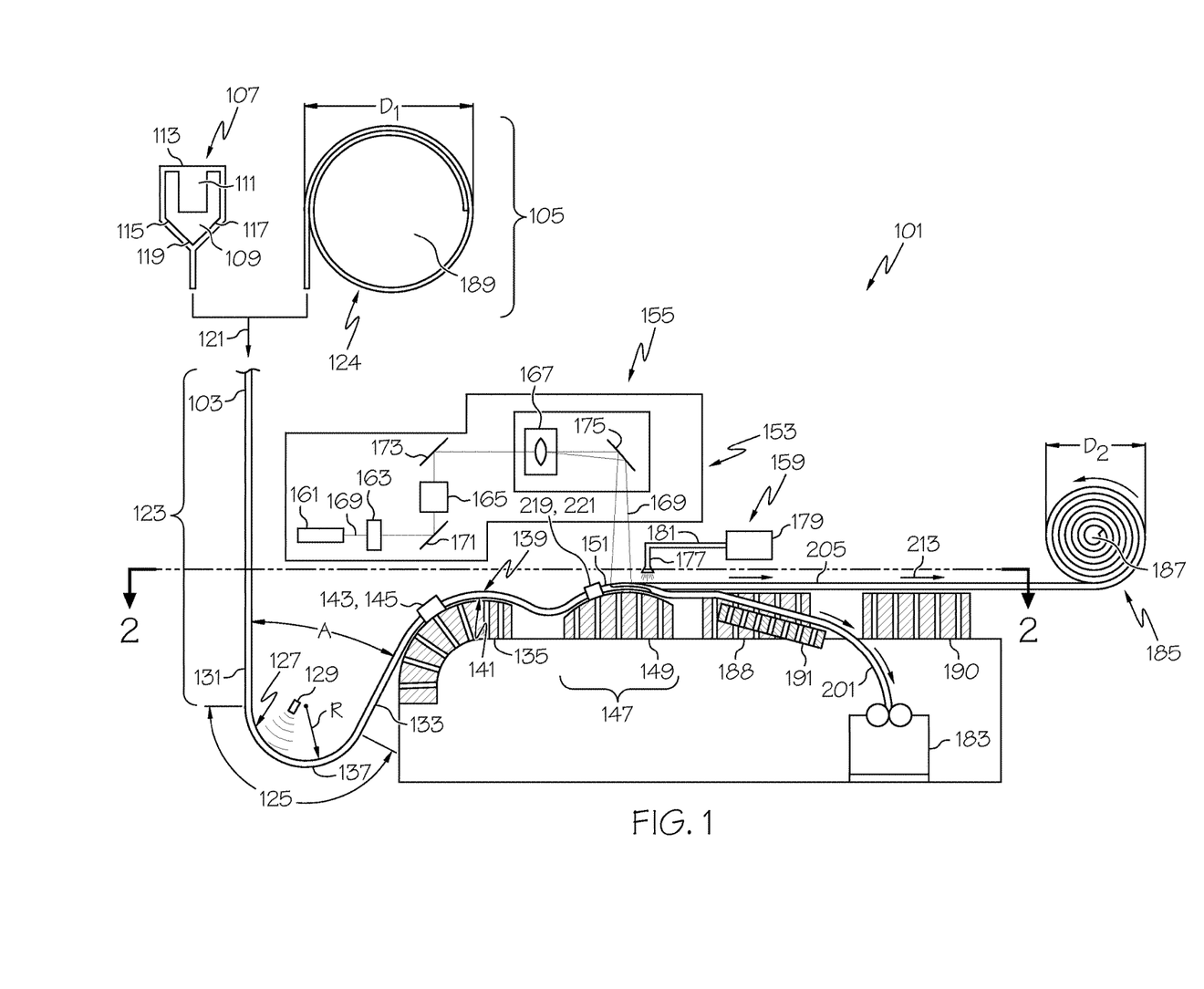
FIG. 1 illustrates a schematic view of an example apparatus for fabricating a glass ribbon.

FIG. 1 illustrates an apparatus 101 for fabricating a glass ribbon 103. The glass ribbon 103 can be provided by a wide range of glass ribbon sources. FIG. 1 illustrates two example sources 105 of glass ribbon 103 although other sources may be provided in further examples. For instance, as shown in FIG. 1, the source 105 of glass ribbon 103 can comprise a down draw glass forming apparatus 107. As schematically shown, the down draw glass forming apparatus 107 can include a forming wedge 109 at the bottom of a trough 111. In operation, molten glass 113 can overflow the trough 111 and flow down opposite sides 115, 117 of the forming wedge 109. The two sheets of molten glass are subsequently fused together as they are drawn off the root 119 of the forming wedge 109. As such, the glass ribbon 103 may be fusion down drawn to traverse in a downward direction 121 off the root 119 of the forming wedge 109 and directly into a downward zone 123 positioned downstream from the down draw glass forming apparatus 107.

Figure 2:
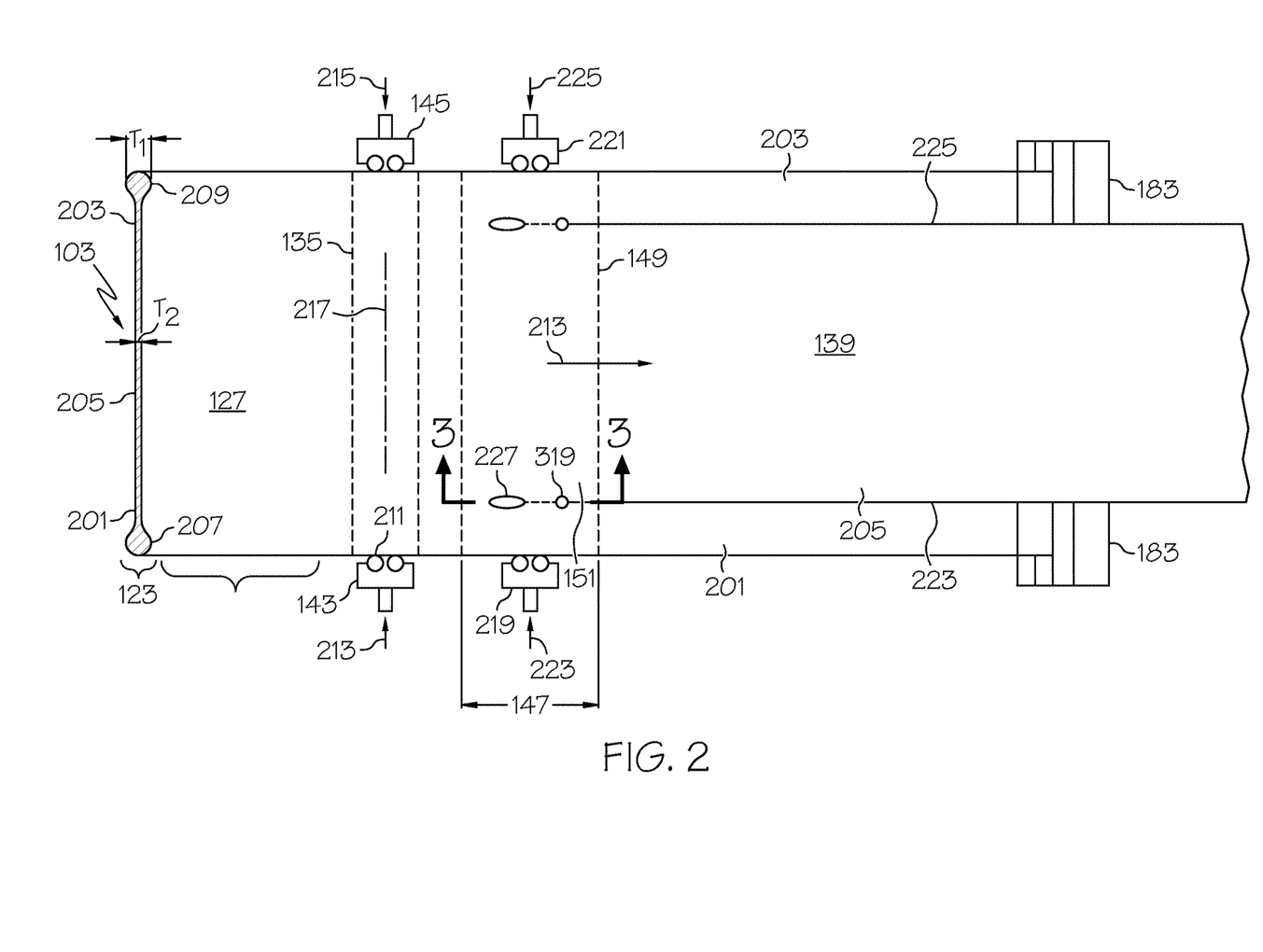
FIG. 2 is a sectional view of the apparatus along line 2-2 of FIG. 1.

As shown by the cross section of FIG. 2, the glass ribbon 103 can include a pair of opposed edge portions 201, 203 and a central portion 205 spanning between the opposed edge portions 201, 203. Due to the down draw fusion process, the edge portions 201, 203 of the glass ribbon may have corresponding beads 207, 209 with a thickness "$T_1$" that is greater than a thickness "$T_2$" of the central portion 205 of the glass ribbon 103. The apparatus 101 can be designed to process glass ribbons 103 with a thin central portion 205, such as glass ribbons with a thickness "$T_2$" in a range of from about 20 microns to about 300 microns, such as from about 50 microns to about 300 microns, such as from about 85 microns to about 150 microns although glass ribbons with other thicknesses may be processed in further examples.

Turning back to FIG. 1, another example source 105 of glass ribbon 103 can comprise a coiled spool 124 of glass ribbon 103. For example, glass ribbon 103 may be wound into the coiled spool 124 after being drawn into a glass ribbon, for example, with the down draw glass forming apparatus 107. The greater thickness of the edge portions 201, 203 may increase the minimum bend radius to avoid cracking or breaking the glass ribbon. As such, if coiled, the glass ribbon 103 may be coiled with a relatively large bend radius such that a given length of glass ribbon 103 would require a coiled spool 124 with a relatively large diameter "$D_1$". Thus, if the source 105 comprises the coiled spool 124, the glass ribbon 103 may be uncoiled from the coiled spool 124 of glass ribbon 103 to traverse the glass ribbon 103 in the downward direction 121 into the downward zone 123.

The apparatus can also include a bending zone 125 downstream from the downward zone 123. In the bending zone 125, the apparatus 101 can be designed to permit the glass ribbon 103 to travel through a curved path such that an upper surface 127 of the glass ribbon 103 comprises an upwardly concave surface as the ribbon bends through a radius "R" within the bending zone 125. The radius "R" may be greater than a minimum bend radius of the glass ribbon 103 to avoid stress concentrations in the glass ribbon 103. The glass ribbon 103 may extend through various arcs within the bending zone 125 such that the a pre-bending portion 131 of the glass ribbon 103 entering the bending zone 125 can extend at various angles with respect to a post-bending portion 133 of the glass ribbon 103. For example, as shown in FIG. 1, the angle "A" between the pre-bending portion 131 and the post-bending portion 133 can comprise an acute angle although angles of 90° or more may be provided in further examples while still providing the upwardly concave surface 127.

The apparatus 101 can further include an optional bending support member 135 in examples where the elevation of a lower portion 137 of the glass ribbon within the bending zone 125 is lower than a lateral travel elevation of the glass ribbon passing through support portions leading to a cutting zone 147. The bending support member 135, if provided, can comprise a non-contact support member 135 designed to support the glass ribbon 103 without touching the opposed faces 139, 141 of the central portion 205 of the glass ribbon 103. For example, the bending support member 135 can comprise one or more curved air bars configured to provide a cushion of air to space the glass ribbon from contacting the bending support member 135.

Examples of the apparatus 101 can include lateral guides 143, 145 to help orient the glass ribbon 103 in the correct lateral position relative to a travel direction 213 of the glass ribbon 103. For example, as schematically shown in FIG. 2, the lateral guides can each comprise rollers 211 configured to engage a corresponding one of the opposed edge portions 201, 203. Corresponding forces 213, 215 applied to the edge portions 201, 203 by the corresponding lateral guides 143, 145 can help properly shift and align the glass ribbon 103 in the proper lateral orientation along a direction of an axis 217 transverse to the travel direction 213 of the glass ribbon 103.

As further illustrated, the lateral guides 143, 145 can be designed to engage the edge portions 201, 203 without engaging the central portion 205 of the glass ribbon 103. As such, the pristine surfaces of the opposed faces 139, 141 of the central portion 205 of the glass ribbon 103 can be maintained while avoiding undesired scratching or other surface contamination that might otherwise occur if the lateral guides 143, 145 were to engage either of the opposed faces 139, 141 of the central portion 205 of the glass ribbon 103. Moreover, the lateral guides 143, 145 may engage the glass ribbon 103 as it is being bent about the axis 217 transverse to the travel direction 213 of the glass ribbon 103. Bending the glass ribbon 103 over the bending support member 135 can increase the rigidity of the glass ribbon 103 throughout the bend. As such, the lateral guides 143, 145 can engage the glass ribbon 103 in a bent condition as the glass ribbon 103 passes over the bending support member 135. The forces 213, 215 applied by the lateral guides 143, 145 are therefore less likely to buckle or otherwise disturb the stability of the glass ribbon profile when laterally aligning as the glass ribbon 103 passes over the bending support member 135.

The apparatus can further include a cutting zone 147 downstream from the bending zone 125. In one example, the apparatus 101 may include a cutting support member 149 configured to bend the glass ribbon 103 in the cutting zone 147 to provide a bent target segment 151 with non-planar bent edge portions 201, 203 and a non-planar bent central portion 205 in the cutting zone 147. Bending the target segment 151 within the cutting zone 147 can help stabilize the glass ribbon 103 during the cutting procedure. Such stabilization can help prevent buckling or disturbing the glass ribbon profile during the procedure of severing at least one of the opposed non-planar bent edge portions 201, 203 from the non-planar bent central portion 205 of the glass ribbon 103.

The cutting support member 149, if provided, can comprise a non-contact cutting support member 149 designed to support the glass ribbon 103 without touching the opposed faces 139, 141 of the glass ribbon 103. For example, referring to FIG. 3, the non-contact cutting support member 149 can comprise one or more curved air bars configured to provide a cushion of air to space between the glass ribbon 103 and the cutting support member 149 to prevent the central portion 205 of the glass ribbon 103 from contacting the cutting support member 149.

Figure 3:
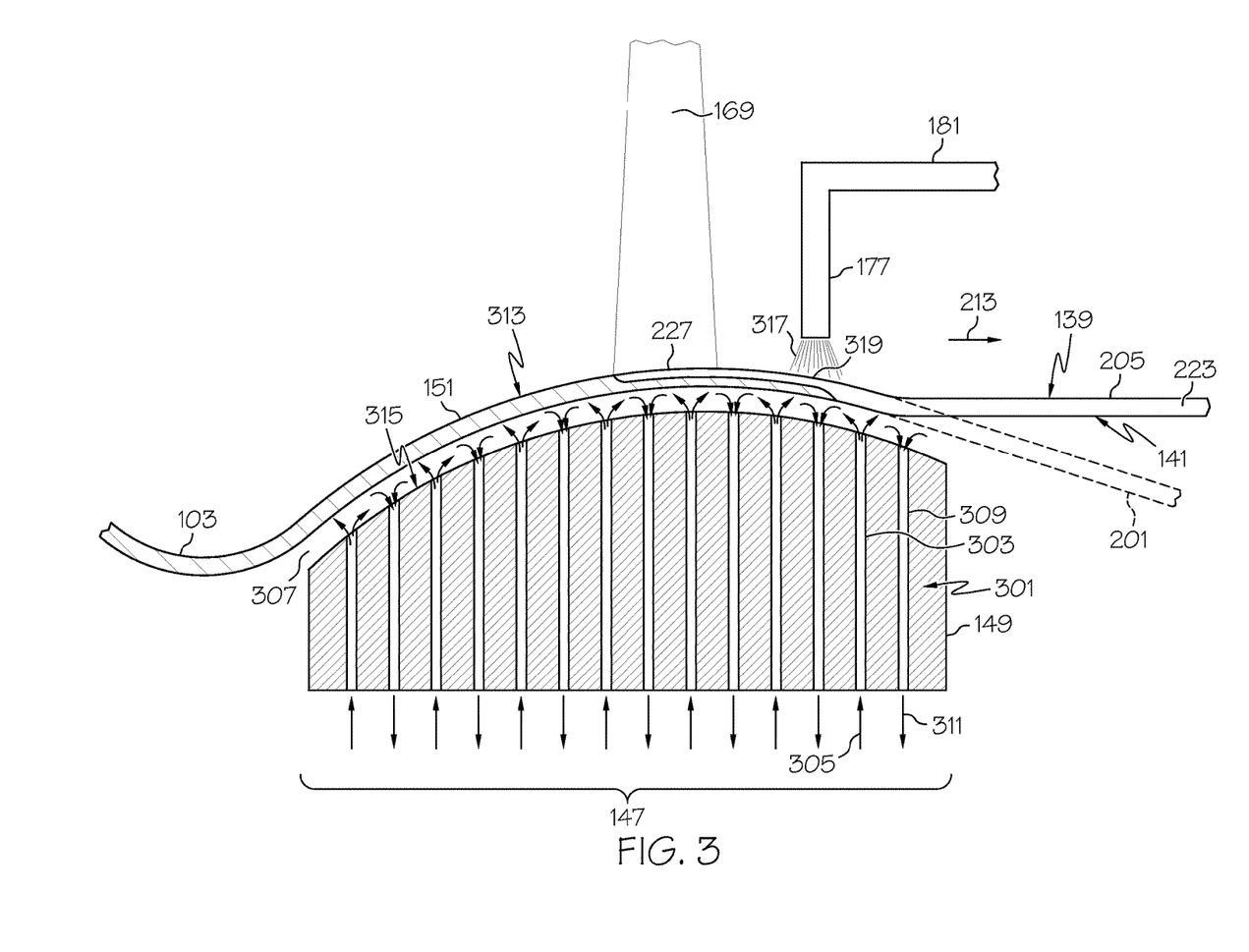
FIG. 3 is a sectional view of the apparatus along line 3-3 of FIG. 2, illustrating an example cutting support member with an upwardly facing convex support surface.

Referring to FIG. 3, the cutting support member 149 can be provided with a plurality of passages 301 configured to provide positive pressure ports 303 such that an air stream 305 can be forced through the positive pressure ports 303 toward the bent target segment 151 to create an air cushion 307 for a noncontact support of the bent target segment 151. Optionally, the plurality of passages 301 can include negative pressure ports 309 such that an air stream 311 can be drawn away from the bent target segment 151 to create a suction to partially counteract the force from the air cushion created by the positive pressure ports 303. A combination of positive and negative pressure ports can help stabilize the bent target segment 151 throughout the cutting procedure. Indeed, the positive pressure ports 303 can help maintain a desired air cushion 307 height between the central portion 205 of the glass ribbon 103 and the cutting support member 149. At the same time, the negative pressure ports 309 can help pull the glass ribbon toward the cutting support member 149 to prevent the glass ribbon 103 from undulating or having portions of the bent target segment 151 from floating away from other portions of the target segment when traversing over the cutting support member 149 in the travel direction 213.

Providing a bent target segment 151 in the cutting zone 147 can also increase the rigidity of the glass ribbon 103 throughout the cutting zone 147. As such, as shown in FIG. 2, optional lateral guides 219, 221 can engage the glass ribbon 103 in a bent condition as the glass ribbon 103 passes over the cutting support member 149 within the cutting zone 147. Forces 223, 225 applied by the lateral guides 219, 221 are therefore less likely to buckle or otherwise disturb the stability of the glass ribbon profile when laterally aligning as the glass ribbon 103 passes over the cutting support member 149. The optional lateral guides 219, 221 can therefore be provided to fine tune the bent target segment 151 at the proper lateral orientation along a direction of the axis 217 transverse to the travel direction 213 of the glass ribbon 103.

As set forth above, providing the bent target segment 151 in a bent orientation within the cutting zone 147 can help stabilize the glass ribbon 103 during the cutting procedure. Such stabilization can help prevent buckling or disturbing the glass ribbon profile during the procedure of severing at least one of the opposed edge portions 201, 203. Moreover, the bent orientation of the bent target segment 151 can increase the rigidity of the target segment to allow optional fine tune adjustment of the lateral orientation of the bent target segment 151. As such, relatively thin glass ribbons 103 can be effectively stabilized and properly laterally oriented without contacting the pristine opposed faces 139, 141 of the central portion 205 of the glass ribbon 103 during the procedure of severing at least one of the opposed edge portions 201, 203 from the central portion 205 of the glass ribbon 103.

Increased stabilization and rigidity of the bent target segment 151 of the glass ribbon 103 can be achieved by bending the target segment to include an upwardly convex surface and/or an upwardly concave surface along a direction of the axis 217 transverse to the travel direction 213. For example, as shown in FIG. 3, the bent target segment 151 includes non-planar bent edge portions and a non-planar bent central portion which form an upwardly facing convex surface 313. Examples of the disclosure can involve supporting the bent target segment 151 with an upwardly facing convex support surface 315 of the cutting support member 149, such as the illustrated air bar. As shown in FIG. 2, providing the cutting support member 149 with an upwardly facing convex support surface 315 can likewise bend the glass ribbon 103 in the cutting zone 147 to achieve the illustrated bent orientation with the upwardly facing convex surface 313.

Figure 4:
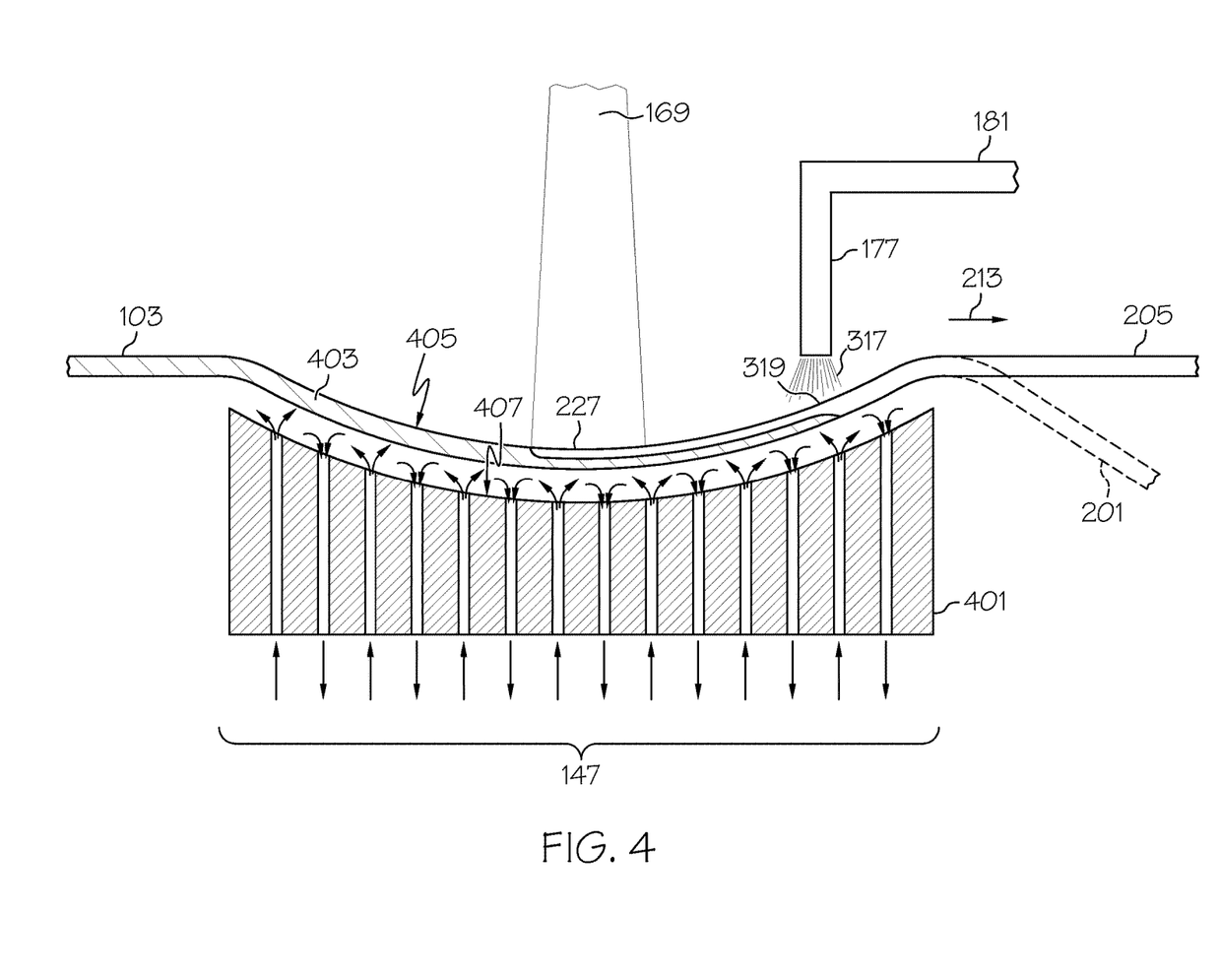
FIG. 4 is a sectional view of the apparatus similar to FIG. 3, but illustrating another example cutting support member with an upwardly facing concave support surface.

In another example, as shown in FIG. 4, another cutting support member 401 can be provided that is similar to the cutting support member 149 illustrated in FIG. 3. However, as shown in FIG. 4, the cutting support member 401 can be provided to support a bent target segment 403 with non-planar bent edge portions and a non-planar bent central portion which form an upwardly facing concave surface 405. Therefore, further examples of the disclosure can involve supporting the bent target segment 403 with an upwardly facing concave support 407 of the cutting support member 401 such as the illustrated air bar. As shown in FIG. 4, providing the cutting support member 401 with an upwardly facing concave support surface 407 can likewise bend the glass ribbon 103 in the cutting zone 147 to achieve the illustrated bent orientation with the upwardly facing concave surface 405.

The apparatus 101 can further include a wide range of cutting devices configured to sever the edge portions 201, 203 from the central portion 205 of the glass ribbon 103. In one example, as shown in FIG. 1, one example glass cutting device 153 can include an optical delivery apparatus 155 for irradiating and therefore heating a portion of the upwardly facing surface of the bent target segment 151. In one example, optical delivery apparatus 155 can comprise a radiation source such as the illustrated laser 161 although other radiation sources may be provided in further examples. The optical delivery apparatus 155 can further include a circular polarizer 163, a beam expander 165, and a beam shaping apparatus 167.

The optical delivery apparatus 155 may further comprise optical elements for redirecting a beam of radiation (e.g., laser beam 169) from the radiation source (e.g., laser 161), such as mirrors 171, 173 and 175. The radiation source can comprise the illustrated laser 161 configured to emit a laser beam having a wavelength and a power suitable for heating the glass ribbon 103 at a location where the beam is incident on the glass ribbon 103. In one embodiment, laser 161 can comprise a $CO_2$ laser although other laser types may be used in further examples.

The laser 161 may be configured to initially emit the laser beam 169 with a substantially circular cross section (i.e. the cross section of the laser beam at right angles to the longitudinal axis of the laser beam). The optical delivery apparatus 155 is operable to transform laser beam 169 such that the beam has a significantly elongated shape when incident on glass ribbon 103. As shown in FIG. 2, the elongated shape can produce an elongated radiation zone 227 that may include the illustrated elliptical footprint although other configurations may be provided in further examples. The elliptical foot print can be positioned on the upwardly facing convex or concave surface 313, 405 of the bent target segment 151, 403.

The boundary of the elliptical footprint can be determined as the point at which the beam intensity has been reduced to $1/e^2$ of its peak value. The laser beam 169 passes through circular polarizer 163 and is then expanded by passing through beam expander 165. The expanded laser beam then passes through beam shaping apparatus 167 to form a beam producing the elliptical footprint on a surface of the bent target segment 151, 403. The beam shaping apparatus 167 may, for example, comprise one or more cylindrical lenses. However, it should be understood that any optical elements capable of shaping the beam emitted by laser 161 to produce an elliptical footprint on the bent target segment 151, 403 may be used.

The elliptical footprint can include a major axis that is substantially longer than a minor axis. In some embodiments, for example, major axis is at least about ten times longer than minor axis. However, the length and width of the elongated radiation zone are dependent upon the desired severing speed, desired initial crack size, thickness of the glass ribbon, laser power, etc., and the length and width of the radiation zone may be varied as needed.

As further shown in FIG. 1, the example glass cutting device 153 can also include a coolant fluid delivery apparatus 159 configured to cool the heated portion of the upwardly facing surface of the bent target segment 151. The coolant fluid delivery apparatus 159 can comprise a coolant nozzle 177, a coolant source 179 and an associated conduit 181 that may convey coolant to the coolant nozzle 177.

With reference to FIG. 3, the coolant nozzle 177 can be configured to deliver a coolant jet 317 of coolant fluid to the upwardly facing surface 313, 405 of the bent target segment 151, 403. The coolant nozzle 177 can have various internal diameters to form a cooling zone 319 of a desired size. As with elongated radiation zone 227, the diameter of coolant nozzle 177, and the subsequent diameter of coolant jet 317, may be varied as needed for the particular process conditions. In some embodiments, the area of the glass ribbon immediately impinged upon by the coolant (cooling zone) can have a diameter shorter than the minor axis of the radiation zone 227. However, in certain other embodiments, the diameter of the cooling zone may be larger than the minor axis of elongated radiation zone 227 based on process conditions such as speed, glass thickness, laser power, etc. Indeed, the (cross sectional) shape of the coolant jet may be other than circular, and may, for example, have a fan shape such that the cooling zone forms a line rather than a circular spot on the surface of the glass ribbon. A line-shaped cooling zone may be oriented, for example, perpendicular to the major axis of elongated radiation zone 227. Other shapes may be beneficial.

In one example, the coolant jet 317 comprises water, but may be any suitable cooling fluid (e.g., liquid jet, gas jet or a combination thereof) that does not stain or damage the upwardly facing surface 313, 405 of the bent target segment 151, 403 of the glass ribbon 103. The coolant jet 317 can be delivered to a surface of the glass ribbon 103 to form the cooling zone 319. As shown, the cooling zone 319 can trail behind the elongated radiation zone 227 to propagate an initial crack formed by aspects of the disclosure described more fully below.

The combination of heating and cooling with the laser apparatus 155 and the cooling apparatus 159 can effectively sever the edge portions 201, 203 from the central portion 205 while minimizing or eliminating undesired residual stress, microcracks or other irregularities in the opposed edges 223, 225 of the central portion 205 that may be formed by other severing techniques. Moreover, due to the bent orientation of the bent target segment 151 within the cutting zone 147, the glass ribbon 103 can be properly positioned and stabilized to facilitate precise severing of the opposed edges 223, 225 during the severing process. Still further, due to the convex surface topography of the upwardly facing convex support surface 315 the edge portions (e.g., see 201 in broken lines in FIG. 3) can immediately travel away from the central portion 205, thereby reducing the probability that the edge portions will subsequently engage (and therefore damage) the pristine faces 139, 141 and/or the high quality opposed edges 223, 225 of the central portion 205.

Turning back to FIG. 1, the apparatus 101 may include structures configured to further process the severed edge portions 201, 203 and/or the central portion 205 of the glass ribbon 103 downstream from the cutting zone 147. For example, one or more glass ribbon choppers 183 may be provided to chop, shred, break or otherwise compact the segments for disposal or recycling.

The central portion 205 of the glass ribbon 103 can be further processed by cutting into glass sheets for incorporation into optical components. For example, the apparatus 101 may include another severing device (not shown) configured to sever the central portion 205 of the glass ribbon 103 along the axis 217 transverse to the travel direction 213 of the glass ribbon 103. Alternatively, as shown in FIG. 1, the central portion 139 of the glass ribbon 103 can be coiled into a coiled spool 185 for later processing. As shown, removing the edge portions 201, 203 consequently removes the corresponding beads 207, 209. Removing the beads reduces the minimum bend radius to allow the central portion 205 of the glass ribbon 103 to be more efficiently wound into a coiled spool 185. As schematically represented in FIG. 1, the wasted central core 187 of the coiled spool 185 is significantly reduced when compared to the wasted central core 189 of the coiled spool 124. As such, the diameter "$D_2$" of the coiled spool 185 of the central portion 205 is significantly smaller than the diameter "$D_1$" of the required to store the same length of pre-processed glass ribbon in the coiled spool 124.

Still further shown in FIG. 1, the apparatus 101 may also include further noncontact support members to guide at least the central portion 205 of the glass ribbon 103 downstream from the cutting zone 147. For example, as shown, the apparatus can include a first air bar 188 and a second air bar 190 to guide the central portion 205 the glass ribbon for final processing without contacting the surfaces. Two support members are illustrated although a single support member or more than two support members may be provided in further examples. As further shown, an optional support member 191 can also be provided to allow the edge portion to be guided to the glass ribbon chopper. The optional support member 191 can optionally comprise an air bar or low friction surface to reduce binding and/or restricted movement as the edge portion proceeds to the glass ribbon choppers 183.

Methods of fabricating a glass ribbon with the apparatus 101 will now be described. As shown in FIG. 1, the method can include the step of traversing the glass ribbon 103 in a downward direction 121 relative to the source 105 through the downward zone 123. As shown, the glass ribbon 103 can travel substantially vertically in the downward direction 121 although the downward direction may be angled in further examples wherein the glass ribbon 103 can travel at an inclined orientation in the downward direction.

The method can further include the step of bending the glass ribbon 103 in the bending zone 125 downstream from the downward zone 123, wherein the glass ribbon 103 includes the upwardly concave surface 127 through the bending zone 125. As shown, the lower portion 137 can be significantly lower than the bent target segment 151 in the cutting zone 147 although the lower portion 137 may be at substantially the same elevation or even higher than the bent target segment in further examples. Providing the lower portion 137 at a significantly lower position, as shown, can develop a predetermined amount of accumulated glass ribbon prior to engaging the support members (e.g., support member 135) of the apparatus 101. As such, vibrations or other disturbances upstream from the lower portion 137 may be absorbed by the accumulated glass ribbon within the bending zone. Moreover, the glass ribbon 103 may be drawn at a substantially constant or desired predetermined rate as it passes through the cutting zone 147 independent of how fast the glass ribbon 103 is being fed into the downward zone 123 by the source 105. As such, providing an accumulation within the bending zone 125 can allow for further stabilization of the glass ribbon 103 within the cutting zone 147 while also allowing the glass ribbon 103 to be passed through the cutting zone 147 at a substantially constant or predetermined rate.

If provided, various techniques may be used to help maintain a desired accumulation of glass ribbon 103 within the bending zone 125. For example, a proximity sensor 129 or other device may be able to sense a position of the accumulated ribbon to adjust the rate at which glass ribbon is fed into the downward zone 123 by the source 105 to provide the appropriate accumulation of glass ribbon 103.

In further examples, the method can further include the step of bending the glass ribbon 103 downstream from the bending zone 125 to redirect the glass ribbon to travel in the travel direction 213. As shown, the bending support member 135 may comprise a bent air bar designed to effect the desired change of direction without contacting the central portion 205 of the glass ribbon 103. Furthermore, the method can also include the optional step of orienting the glass ribbon 103 being bent with the bending support member with the lateral guides 143, 145 to help orient the glass ribbon 103 in the correct lateral position relative to the travel direction 213 of the glass ribbon 103.

The method can also include the step of traversing the glass ribbon 103 into the cutting zone 147 downstream from the bending zone 125 and then bending the glass ribbon 103 in the cutting zone 147 to provide the bent target segment 151, 403 with a bent orientation in the cutting zone 147.

As shown in FIG. 1, the glass ribbon 103 can be bent such that the bent orientation of the target segment 151 includes the upwardly facing convex surface 313. In one example, the method can include the step of supporting the bent target segment 151 with the cutting support member 149 comprising the illustrated curved air bar. As shown, the cutting support member 149 can include an upwardly facing convex support surface 315 configured to bend the target segment 151 to establish the upwardly facing convex surface 313.

As shown in FIG. 4, the glass ribbon 103 can alternatively be bent such that the bent orientation of the target segment 403 includes the upwardly facing concave surface 405. In one example, the method can include the step of supporting the bent target area 403 with the cutting support member 401 comprising the illustrated curved air bar. As shown, the cutting support member 401 can include an upwardly facing concave support surface 407 configured to bend the target segment 403 to establish the upwardly facing concave surface 405.

As shown in FIG. 1, the method can further include the step of severing at least one of the edge portions 201, 203 from the central portion 205 of the bent target segment 151, 403 within the cutting zone 147. As shown in FIG. 2, the examples of the disclosure can include severing both of the edge portions 201, 203 from the central portion 205 although a single edge portion may be severed from the central portion in further examples. Moreover, as shown in FIG. 2, both of the edge portions 201, 203 are severed simultaneously from the central portion 205 although one of the edge portions may be severed before the other edge portion in further examples.

The step of severing can incorporate a wide range of techniques. For example, the edge portions 201, 203 can be severed from the central portion 205 by way of the glass cutting device 153 that can include the illustrated optical delivery apparatus 155 and the coolant fluid delivery apparatus 159.

Figure 5:
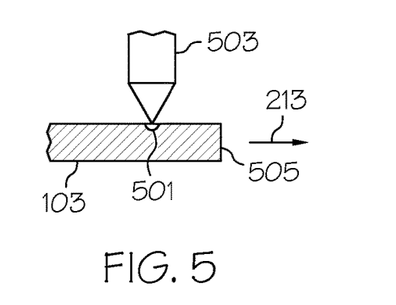
FIG. 5 illustrates an example scribe forming an initial crack in the glass ribbon.
Figure 6:
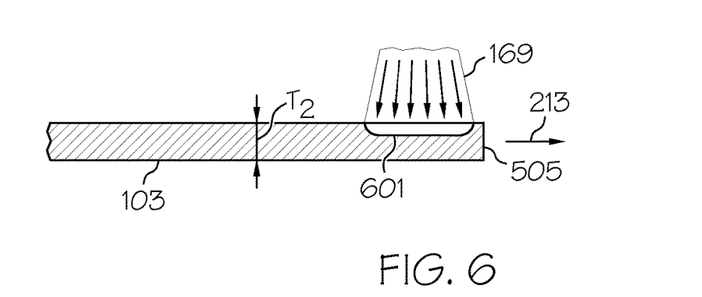
FIG. 6 illustrates an elongated radiation zone of a laser beam propagating the initial crack form FIG. 5 into an elongated crack portion extending partially through the thickness of the glass ribbon.
Figure 7:
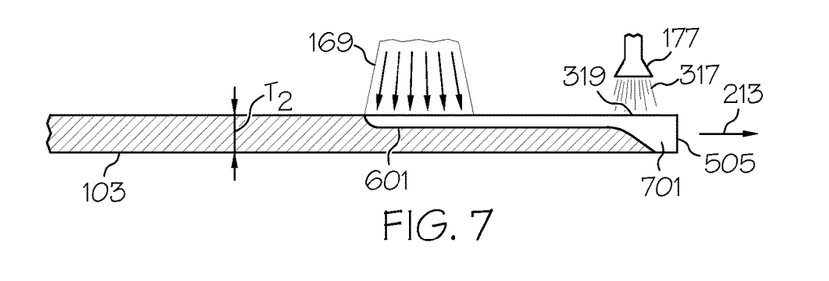
FIG. 7 illustrates a coolant jet propagating the elongated crack portion of FIG. 6 completely through the thickness of the glass ribbon to sever the corresponding end portions from the central portion of the glass ribbon.

One example of initiating the severing process is illustrated in FIGS. 5-7. As shown in FIG. 5, a scribe 503 or other mechanical device can create an initial crack 501 with the point of the scribe to create a controlled surface defect at the site where the glass ribbon is to be severed. As shown, the scribe 503 includes a tip although an edge blade or other scribe technique may be used in further examples. Still further, the initial crack 501 or other surface imperfection may be formed by etching, laser impact, or other techniques.

As further illustrated in FIG. 5, the initial crack 501 or surface imperfection can be initially formed adjacent a leading edge 505 of the glass ribbon 103 traversing in the travel direction 213. As shown in FIG. 6, the elongated radiation zone 227 may be formed on the upwardly facing convex or concave surface 313, 405. As the elongated radiation zone 227 is elongated in the travel direction 213, the initial crack 501 can propagate into an elongated crack portion 601 extending partially through the thickness "$T_2$" of the glass ribbon 103. As shown in FIG. 7, the coolant jet 317 then contacts the cooling zone 319 to further propagate the elongated crack portion 601 completely through the thickness "$T_2$" of the glass ribbon 103 to sever the corresponding edge portions 201, 203 from the central portion 205 as indicated by reference number 701 in FIG. 7.

As shown in FIG. 3, the severed the opposed edge portions 201, 203 can be effectively removed while leaving the central portion 205 with high quality opposed edges 229, 231 with reduced internal stress profiles, reduced cracks, or other imperfections in the opposed edges 229, 231. As such, the central portion 205 can be bent, such as wound in the coiled spool 185 without cracking that may otherwise occur with reduced quality edges. Moreover, the higher quality edges can avoid scratching the central portion 205 during coiling that might otherwise occur with edge portions including glass shards or other imperfections.

The method can further include the step of supporting the bent target segment 151, 403 with the upwardly facing convex or concave surface 315, 407 of the cutting support member 149, 401. For instance, the bent target segment 151, 403 can be supported by the convex or concave surface 315, 407 of the illustrated air bar while severing the edge portions 201, 203 form the central portion 205 of the bent target segment 151, 403 within the cutting zone 147.

The method can still further include the step of coiling the central portion 205 of the glass ribbon 103 into the coiled spool 185 after the step of severing. As such, the high quality central portion 205 of the glass ribbon may be efficiently coiled into a coiled spool 185 for subsequent shipping or processing into glass sheets.

Figure 8:
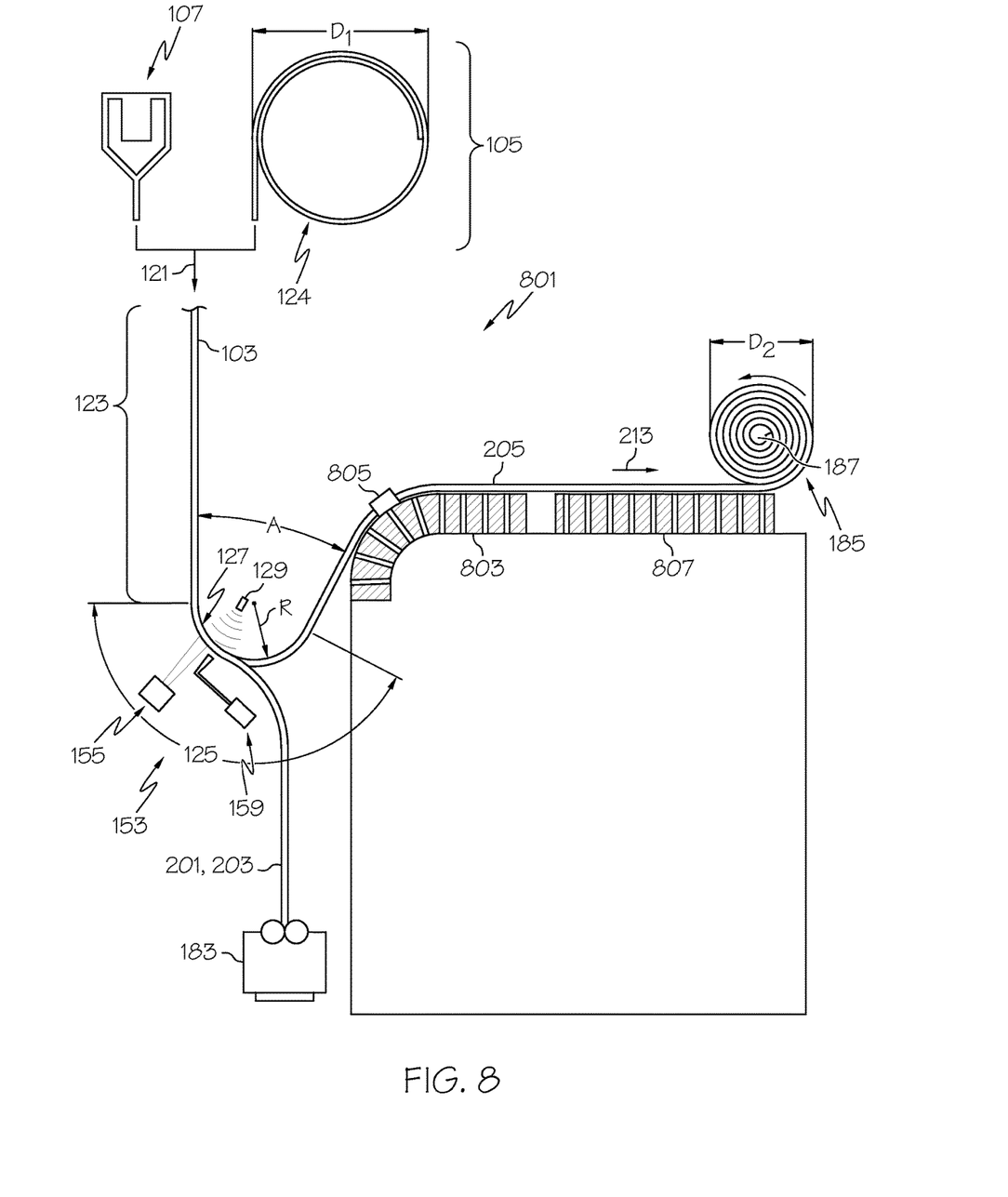
FIG. 8 illustrates a schematic view of another example apparatus for fabricating a glass ribbon.

FIG. 8 illustrates an alternative apparatus 801 configured to sever at least one of the opposed edge portions 201, 203 from the central portion 205 of the glass ribbon 103. As shown, the glass ribbon 103 can be cut in the bending zone 125 while the central portion 205 may thereafter be guided, for example, by way of support members 803, 807. As illustrated, the support members 803, 807 can comprise noncontact support members, such as the illustrated air bars, configured to support the central portion 205 of the glass ribbon without contacting the pristine optical surfaces of the central portion 205. The central portion 205 of the glass ribbon 103 can then be guided for coiling into the coiled spool 185. Optional lateral guides 805 can be provided to help laterally orient the central portion 205 of the glass ribbon to prevent the glass ribbon 103 from floating off the support surface of the corresponding support members 803, 807.

Methods of fabricating the glass ribbon with the apparatus 801 shown in FIG. 8 will now be described. The method can include the step of traversing the glass ribbon 103 in the downward direction 121 relative to the source 105 through the downward zone 123. The method can further include the step of bending the glass ribbon in the bending zone 125 downstream from the downward zone 123. Once bent, the glass ribbon 103 includes non-linear bent edge portions and a non-linear bent central portion forming an upwardly concave surface 127 through the bending zone 125. The method further includes the step of severing at least one of the non-linear bent edge portions 201, 203 from the non-linear bent central portion 205 within the bending zone 125.

As shown, severing can occur within the bending zone 125 without necessarily supporting the target segment 809 with a support structure. Rather, gravity works to draw the edge portions 201, 203 away from the central portion 205. Therefore, once severed, the edge portions 201, 203 can naturally move away from the central portion 205 under the influence of gravity. As such, there is a reduced probability of the severed edge portions 201, 203 achieving inadvertent contact with the pristine surface of the central portion 205.

As shown, the step of severing shown in FIG. 8 can be conducted with the glass cutting device 153 although other cutting devices may be incorporated in further examples. As further shown in FIG. 8, once severing is complete, the method can also include the optional steps of guiding the central portion 205, for example, with support members 803, 807 and coiling the central portion 205 into the coiled spool 185.

It will be apparent to those skilled in the art that various modifications and variations can be made without departing from the spirit and scope of the claimed invention.

What is claimed is:

1. A method of fabricating a glass ribbon comprising the steps of:
   (I) providing a source of the glass ribbon with a pair of opposed edge portions and a central portion laterally spanning between the opposed edge portions;
   (II) traversing the glass ribbon in a downward direction relative to the source through a downward zone;
   (III) bending the glass ribbon in a bending zone downstream from the downward zone, wherein the glass ribbon comprises an upwardly concave surface through the bending zone;
   (IV) traversing the glass ribbon through a cutting zone downstream from the bending zone;
   (V) bending the edge portions and the central portion of the glass ribbon in the cutting zone to provide a bent target segment with non-planar bent edge portions and a non-planar bent central portion in the cutting zone; and
   (VI) severing at least one of the non-planar bent edge portions from the non-planar bent central portion within the cutting zone, wherein the severing occurs at a location of the bent target segment where the non-planar bent edge portions and the non-planar bent central portion are non-planar and bent.

2. The method of claim 1, further comprising the step of supporting the bent target segment with air from a curved air bar while performing the step of severing at least one of the non-planar bent edge portions from the non-planar bent central portion within the cutting zone.

3. The method of claim 1, wherein during step (V) the edge portions and the central portion of the glass ribbon are bent such that the non-planar bent edge portions and the non-planar bent central portion form an upwardly facing convex region comprising an upwardly facing convex surface.

4. The method of claim 3, wherein the step of severing at least one of the non-planar bent edge portions from the non-planar bent central portion comprises a step of heating a portion of the upwardly facing convex surface with an optical delivery apparatus.

5. The method of claim 4, wherein the step of severing at least one of the non-planar bent edge portions from the non-planar bent central portion further comprises cooling the heated portion of the upwardly facing convex surface with a coolant fluid.

6. The method of claim 4, wherein the step of heating the portion of the upwardly facing convex surface comprises shaping a laser beam of the optical delivery apparatus to contact the portion of the convex surface with an elongated radiation zone of the laser beam.

7. The method of claim 3, further comprising the step of supporting the upwardly facing convex region comprising the upwardly facing convex surface with air from an upwardly facing convex support surface of an air bar while performing the step of severing at least one of the non-planar bent edge portions from the non-planar bent central portion within the cutting zone.

8. The method of claim 1, wherein during step (V) the edge portions and the central portion of the glass ribbon are bent such that the non-planar bent edge portions and the non-planar bent central portion form an upwardly facing concave region comprising an upwardly facing concave surface.

9. The method of claim 8, wherein the step of severing at least one of the non-planar bent edge portions from the non-planar bent central portion comprises a step of heating a portion of the upwardly facing concave surface with an optical delivery apparatus.

10. The method of claim 9, wherein the step of severing at least one of the non-planar bent edge portions from the non-planar bent central portion further comprises cooling the heated portion of the upwardly facing concave surface with a coolant fluid.

11. The method of claim 9, wherein the step of heating the portion of the upwardly facing concave surface comprises shaping a laser beam from the optical delivery apparatus to contact the portion of the concave surface with an elongated radiation zone of the laser beam.

12. The method of claim 8, further comprising the step of supporting the upwardly facing concave region comprising the upwardly facing concave surface with air from an upwardly facing concave support surface of an air bar while performing the step of severing at least one of the non-planar bent edge portions from the non-planar bent central portion within the cutting zone.

13. The method of claim 1, wherein the source comprises a coiled spool of glass ribbon and the method further comprises the step of uncoiling the glass ribbon from the coiled spool of glass ribbon to traverse the glass ribbon in the downward direction during step (II).

14. The method of claim 1, wherein the source comprises a down draw glass forming apparatus and the method further comprises the step of fusion down drawing the glass ribbon from the down draw glass forming apparatus to traverse the glass ribbon in the downward direction during step (II).

15. The method of claim 1, further comprising the step of coiling the central portion of the glass ribbon into a storage roll after step (VI).

16. A method of fabricating a glass ribbon comprising the steps of:
   (I) providing a source of the glass ribbon with a pair of opposed edge portions and a central portion laterally spanning between the opposed edge portions;
   (II) traversing the glass ribbon in a downward direction relative to the source through a downward zone;
   (III) bending the edge portions and the central portion of the glass ribbon in a bending zone downstream from the downward zone to provide a bent target segment with non-planar bent edge portions and a non-planar bent central portion, wherein the non-planar bent edge portions and the non-planar bent central portion form an upwardly concave surface through the bending zone; and
   (IV) severing at least one of the non-planar bent edge portions from the non-planar bent central portion within the bending zone, wherein the severing occurs at a location of the bent target segment where the non-planar bent edge portions and the non-planar bent central portion are non-planar and bent.

17. The method of claim 16, wherein the source comprises a coiled spool of glass ribbon and the method further comprises the step of uncoiling the glass ribbon from the coiled spool of glass ribbon to traverse the glass ribbon in the downward direction during step (II).

18. The method of claim 16, wherein the source comprises a down draw glass forming apparatus and the method further comprises the step of fusion down drawing the glass ribbon from the down draw glass forming apparatus to traverse the glass ribbon in the downward direction during step (II).

19. The method of claim 16, further comprising the step of coiling the central portion of the glass ribbon into a coiled spool of glass ribbon after step (IV).

* * * * *